3,245,998
PROCESSES FOR THE PRODUCTION OF
PICOLINIC ACID DERIVATIVES
Niels Clauson-Kaas, Farum, Denmark, and Rolf Denss, Basel, Franz Ostermayer, Riehen, and Ernst F. Renk, Basel, Switzerland, assignors to Geigy Chemical Corporation, Town of Greenburgh, N.Y., a corporation of Delaware
No Drawing. Filed Sept. 18, 1963, Ser. No. 310,191
Claims priority, application Switzerland, Nov. 14, 1961, 13,217/61; Sept. 26, 1962, 11,346/62, 11,347/62
12 Claims. (Cl. 260—294.9)

This application is a continuation-in-part of our pending application Serial No. 236,712 filed on November 9, 1962 (now U.S. Patent No. 3,122,538).

According to a first aspect, the present invention concerns a new process for the production of 3,4-dihydro-2,4-dioxo-2H-pyrido[2,3-e][1,3]oxazine.

It has surprisingly been found that 3,4-dihydro-2,4-dioxo-2H-pyrido[2,3-e][1,3]oxazine of formula

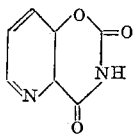   (I)

can be produced by treating 5-(2'-furyl)-hydantoin of formula

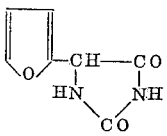   (II)

with an oxidizing agent in an acid, aqueous reaction medium. This conversion from furyl hydantoin to the aforesaid oxazine derivative by oxidizing agents is an unexpected, hitherto unknown reaction.

The production of the 5-(2'-furyl)-hydantoin of Formula II which is used as starting material, is described, for example, by Henze et al., J. Am. Chem. Soc., 64, 522 (1942), and Harvill et al., J. Org. Chem., 9, 21 (1944).

Halogen, in particular, is used as oxidizing agent. Chlorine is particularly well suited for this purpose either as gas or in the form of a substance which gives off chlorine under the reaction conditions. In the latter case, sodium hypochlorite is preferred as substance giving off chlorine. Bromine is also suitable as oxidizing agent.

The reaction medium is a solvent or diluent such as e.g. water to which a water-soluble polar organic solvent such as e.g. a lower alkanol or ethylene glycol etc. can be added, and which must be acidified, for instance with aqueous acetic acid or hydrochloric acid.

The reaction according to the invention is particularly advantageous, when it is performed in hydrochloric acid-acidified, aqueous or aqueous/organic medium in which the furyl hydantoin to be reacted is suspended or dissolved. The reaction is performed preferably with cooling, at a temperature below room temperature, e.g. at —20° C., but preferably at about 10° to 18° C. The acidity of the reaction medium corresponds, prior to the addition of the oxidizing agent, to that of about 0.5 to 8-normal hydrochloric acid, and preferably to 2-N to 4-N or even 6-N HCl in aqueous solution.

During the introduction of the oxidizing agent, the starting compound of Formula II need not be completely dissolved in the reaction medium, but it is sufficient to cause, for instance, chlorine or bromine to react on a suspension thereof in the aqueous, acid medium, whereby the volume of the reaction mixture can be kept smaller. Approximately 1 to 1.5 moles of chlorine or bromine, or an equivalent amount of hypochlorite are preferably used per mole of starting compound.

In order to obtain good yields, the action of the oxidizing agent on the acid suspension or solution of the furyl hydantoin of Formula II should last more than 30 minutes, but not longer than 2 hours, and preferably from 60 to 90 minutes.

The higher the temperature of the reaction medium, the sooner must the undissolved reaction product of Formula I be separated, e.g. by filtration, from the reaction mixture. Preferably, separation and further processing take place immediately when the temperature during the reaction period had been near room temperature, while, when it had been at lower temperatures, it is preferable to let the reaction mixture stand for about 10 minutes or longer, but for not more than 30 minutes after terminating the introduction of the oxidizing agent, whereby the reaction is allowed to proceed to substantial completion. The separated residue is preferably washed with acetone which serves to remove residual hydantoin therefrom.

The free base of Formula I is obtained by subsequent washing with cold or warm water, of, for instance, the hydrochloride salt of the compound of Formula I which precipitates during the reaction, if hydrochloric acid had been used for acidification of the reaction medium.

Purification is effected with water and/or methanol, and, if desired, with recrystallization from glacial acetic acid, or the like suitable solvents, in a conventional manner.

According to another aspect, the present invention concerns new processes for the production of picolinic acid derivatives as well as new compounds obtained by these processes.

It has been found that, surprisingly, 3-hydroxypicolinic acid amide, of the formula

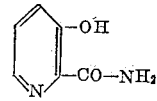   (III)

is obtained either directly, or via the compound of Formula I from 5-(2'-furyl)-hydantoin, in the following manner:

3-hydroxypicolinic acid amide is obtained directly from 5-(2'-furyl)-hydantoin by carrying out the reaction described hereinbefore, for the production of the compound of Formula I, at a higher temperature, by heating the reaction medium during or after the introduction of the oxidizing agent, e.g. chlorine, to just above room temperature and up to about 80° C., but not higher than about 100° C., and preferably to a temperature above 30° C., and either boiling the reaction mixture after termination of the introduction of the oxidizing agent for a few minutes or leaving it stand longer, up to several hours, and even as long as 24 hours, especially when the temperature during the introduction of the oxidizing agent was in the lower range.

A purer product of Formula III can be obtained from the compound of Formula II via the compound of Formula I. After the oxazine of Formula I has been produced under the first aspect of this invention, it is subsequently reacted with water, preferably acidified or made alkaline by the addition of the corresponding agents, at room temperature for at least about 5 hours or at higher temperature of the mixture for a correspondingly shorter time.

The following Reaction Diagram I illustrates the above described processes:

Reaction Diagram I

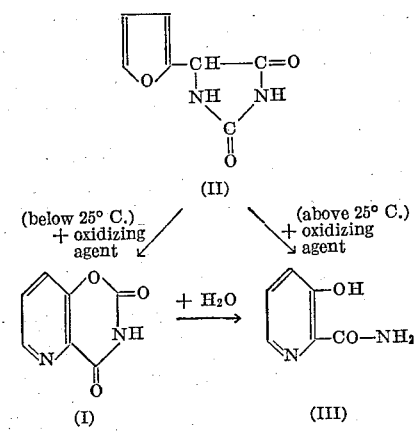

Furthermore, it has been found that 3-hydroxypicolinic acid amide (Formula III) is obtained from furfural, ammonia and hydrocyanic acid via α-furyl-(2)-α-aminoacetonitrile, (Formula IV below, $n$ being 0) (i.e. α-amino-2-furanacetonitrile, according to Chem. Abstract nomenclature) obtained from the aforesaid starting compounds by Strecker synthesis, under practically the same conditions as in the processes descrbied hereinbefore which started from the compound of Formula II, also either directly from the aforesaid acetonitrile of Formula IV, or preferably via α-furyl-(2)-α-amino-acetic acid amide (α-amino-2-furanacetamide, according to Chem. Abstracts nomenclature; (Formula V, below) in accordance with the Reaction Diagram II given further below:

Instead of the α-amino-acetonitrile of Formula IV, there can also be used as starting compound for the production of 3-hydroxy-picolinic acid amide, the corresponding α-ureido-acetonitrile, of the formula

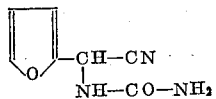

(Formula IV below, $n$ being 1)

which novel compound is obtained when heating the known furyl-(2)-glycolonitrile of the formula

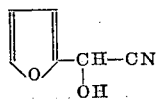

in mixture with an excess of urea until an equimolar amount of water has been set free from Compound VI.

Reaction Diagram II

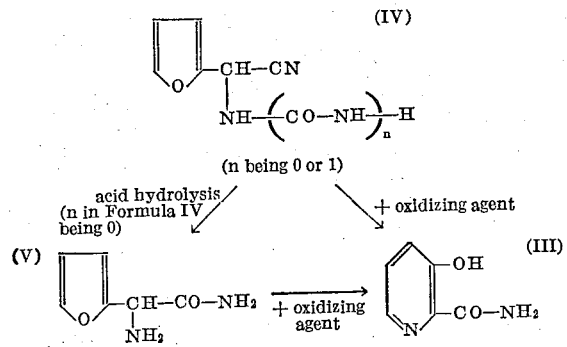

α-amino-2-furanacetonitrile has been described by Sugasawa, J. Pharm. Soc. Japan, 1926, page 66.

The novel intermediate α-amino-2-furanacetamide (Formula V) is readily produced from the compound of Formula IV by hydrolysis, for instance with concentrated hydrochloric acid at room temperature.

All starting materials for the processes illustrated in the two foregoing reaction diagrams are thus obtainable from furfural either in a single step, by the α-aminonitrile synthesis according to Strecker, or by the hydantoin synthesis according to Bucherer, or in two easily realizable steps as described above.

The conversion of the acetamide of Formula V to the end product of Formula III is achieved by treatment in acid, aqueous medium with introduction of an oxidizing agent thereinto, under any of the aforesaid conditions, no special precautions being necessary within the above given maximal and minimal limits for time and temperature, since the reaction, when carried out within these limits, always leads to a high yield of the compound of Formula III.

However, in order to obtain a high yield of the latter end product from either of the compounds of Formula IV, the introduction of the oxidizing agent, preferably either chlorine or bromine, must be carried out while maintaining the reaction medium at a temperature above 30° C. and up to 50° C., and not exceeding 80° C., or, and this is preferred where time is not a decisive factor the introduction of the oxidizing agent is effected somewhat below 30° C., for instance at room temperature, and the resulting mixture is left standing for some time, with or without stirring, at or above room temperature. The temperature depends on the desired length of the total reaction time. For instance, the reaction mixture can be stirred for 24 hours at 30° C. after the introduction of, e.g. chlorine, has been terminated; or, it can be boiled briefly for 2 to 5 minutes.

According to yet another aspect, the present invention relates to a process for producing 3-hydroxypicolinonitrile, of the Formula VII (given below) which is obtained in satisfactory yields from either compound of Formula IV by reacting either of these compounds in a aqueous acid medium, of a strength corresponding to that of about 0.5 N to 8 N-, and preferably 2 N- to 6 N-hydrochloric acid, with an oxidizing agent of the type described above, at a temperature of about 0° to 50° C., and preferably 0° to 30° C., and, in case the introduction of the oxidizing agent, e.g. chlorine, took place at a temperature above 25° C., immediately separating the resutling precipitate of the compound of Formula VII, e.g. by filtration, from the reaction medium. When lower temperature had prevailed during the introduction of the oxidizing agent, the reaction medium can be left standing, with or without stirring, for a period not exceeding 2 to 3 hours, and preferably for a period of 1 to 2 hours, taking, however, care that the temperature of the reaction mixture does not exceed 25° C. at any time. The reactions occurring in processes according to the invention when using starting compounds of Formula IV, are illustrated by the following Reaction Diagram III:

Reaction Diagram III

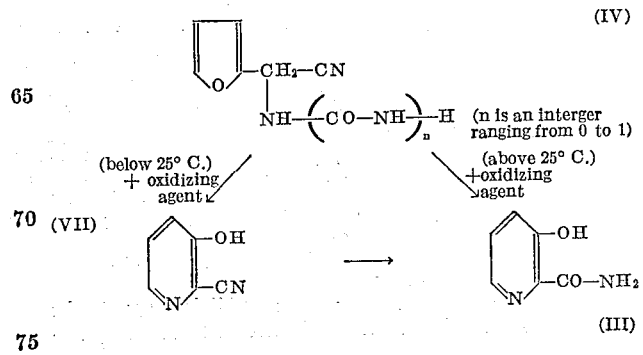

Upon standing at a temperature above 25° C., first a mixture of compound of Formulas III and VII, and ultimately, practically only the amide of Formula III is obtained. The latter is also the case when observing the conditions explained hereinbefore in connection with Reaction Diagram II. Separation of the compounds of Formulas III and VII is achieved by making use of the good solubility of the nitrile of Formula VII in methanol and the fact that the amide of Formula III is difficultly soluble in the said solvent.

Pure 3-hydroxy-picolinonitrile (Formula VII) obtained as described above can also be converted quantitatively to the the amide of Formula III when left standing at room temperature in concentrated hydrochloric acid for about 5 days.

Recovery of the compound of Formula VII is effected from the methanol extracts obtained, for instance in working up the reaction mixture for compound III as described hereinbefore, by evaporation of the methanol solvent and recrystallization from nitromethane.

The processes according to the invention provide for the production from readily available and very economic starting materials, of compounds of the pyridine series which are useful as intermediates in a considerable number of organic syntheses, leading to end products particularly of therapeutical utility.

The above-described methods for producing 3-hydroxy-picolinic acid amide and the novel 3-hydroxy-picolononitrile are of particular interest because they permit obtainment with satisfactory yields and under moderate reaction conditions, of relatively low energy consumption, of further, more sophisticated compounds of greater purity than was hitherto readily attainable. This is particularly made possible, because the two reaction products can be easily isolated from their respective reaction mixtures, especially due to the fact that the amide is much more difficultly soluble in methanol than the nitrile.

To give only one example for further use of the novel nitrile of Formula VII, the latter can be reacted as described above to obtain a particularly pure product of the Formula III (Reaction Diagram III) and the latter with lower alkyl esters of chloroformic acid in the presence of quinoline of sym.-collidine to obtain 2H-pyrido-[2,3-e][1,3]oxazine-2,4(3H)-dione which possesses excellent analgetic, antipyretic and antiphlogistic activity.

*Example 1*

114 g. of chlorine are introduced over 1½ to 2 hours at 15° while stirring vigorously into a suspension of 184 g. of pulverised 5-(2'-furyl)-hydantoin in 420 ml. of 2-N aqueous hydrochloric acid. The suspension is then immediately filtered, the residue is stirred with 300 ml. of acetone and again filtered. The 3,4-dihydro-2,4-dioxo-2H-pyrido[2,3-e][1,3]oxazine hydrochloride formed can be converted into the base by washing with water until the filtrate runs neutral. The base is also obtained by dissolving the hydrochloride in 2-N sodium hydroxide solution and then neutralising with dilute hydrochloric acid. The base is recrystallised from boiling water, glacial acetic acid or pyridine with the addition of charcoal; it then melts at 280°. The compound has no reaction to ferric chloride (in methanol) and no precipitation with a solution of 2,4-dinitro-phenyl hydrazine in 2-N hydrochloric acid. Yield 25–35%.

*Example 2*

Gaseous chlorine, corresponding to a liquid amount of 3.5 ml. at −80° is introduced within 60 minutes at 11–15° into a solution of 8.3 g. of 5-(2'-furyl)-hydantoin in 25 ml. of 6-N aqueous hydrochloric acid and 25 ml. of methanol. The 3,4 - dihydro - 2,4 - dioxo-2H-pyrido-[2,3-e][1,3]oxazine hydrochloride formed is then filtered off, washed with 99% ethanol and dried. Yield 25–35%.

*Example 3*

5.52 g. of 5-(2'-furyl)-hydantoin hydrate are dissolved in 15 ml. of acetic acid and 15 ml. of water. Gaseous chlorine, corresponding to 1.5 ml. of liquid chlorine at −80°, is introduced at 19° within 15 minutes. After cooling to −20°, 30 ml. of 99% ethanol in 10 ml. of ether and 10 ml. of concentrated hydrochloric acid are added. After standing for 10 minutes at −20°, the 3,4-dihydro-2,4-dioxo-2H-pyrido[2,3-e][1,3]oxazine precipitates; it is filtered off, washed with 99% ethanol and dried. Yield 25–30%.

*Example 4*

92 g. of 5-(2'-furyl)-hydantoin are suspended, at similar temperature as in the preceding examples, in 210 ml. of 2-N hydrochloric acid, and, within 1 hour while stirring vigorously, 120 g. of bromine are added dropwise. Immediately after the addition of the bromine, the reaction mixture is filtered and the residue is washed first with acetone and then with water. After recrystallizing from glacial acetic acid, the 3,4-dihydro-2,4-dioxo-2H-pyrido[2,3-e][1,3]oxazine obtained melts at 280°. It is identical with the substance obtained by treating 5-(2'-furyl)-hydantoin with chlorine. Yield 7–10%.

*Example 5*

(a) A mixture of 38.4 g. (0.4 mol) of furfural and 26.4 g. (0.44 mol) of acetic acid is added dropwise within 30 minutes at 0° while stirring to a solution of 21.5 g. of sodium cyanide (technical) in 140 ml. of water. After about a third of the furfural/acetic acid mixture has been dropped in, α-furyl-(2)-glycolonitrile begins to separate as an oil. On completion of the dropwise addition, the oil mentioned is separated by extracting three times with ether. The combined ether solutions are dried with magnesium sulphate and evaporated on a water bath of 50° under decreasing pressure ending at 12 mm. The 49 g. of α-furyl-(2)-glycolonitrile which remains as oil is about 90–95% and can be used direct for further reaction according to step (b) below. The yield, calculated on the furfural, corresponds to the purity of the product, i.e. it is quantitative on the assumption that the reaction product is 100%.

(b) 24.5 g. (0.2 mol) of α-furyl-(2)-glycolonitrile are mixed with 48 g. (0.80 mol) of urea and the mixture is quickly heated to 100° while stirring. The reaction is slightly exothermic and a slight amount of hydrogen cyanide is liberated. A further 24.5 g. of α-furyl-(2)-glycolonitrile are added to the mixture at 100° within 10 minutes and the dark brown oil formed is taken up in 300 ml. of the boiling water.

The liquid is decanted several times leaving an oily substance sticking to the walls of the vessel and finally it is left to cool whereupon α-ureido-α-furyl-(2) acetonitrile crystallizes. It is filtered off, washed with water and dried at 80°. 28 g. (42% of the theoretical) are obtained as a pale brown powder which melts at 147–149° (corrected in Hershberg apparatus). After one recrystallization from nitromethane, 21 g. (32% of the theoretical) are obtained. The substance melts at 152–154°. The melting point does not rise any more after further recrystallization.

(c) 16.5 g. (0.1 mol) of the product obtained according to (b) recrystallised from nitromethane are suspended in 100 ml. of 6 N aqueous hydrochloric acid. 5.0 ml. (0.12 mol) of chlorine (measured as liquid) are introduced into this suspension at 0° within 30 minutes while stirring, any foaming being suppressed by the addition of ether. A dark green clear solution is obtained the temperature of which, on standing at room temperature, rises to 30° within 20–30 minutes whilst carbon dioxide is vigorously developed. The dark green, strongly acid solution is then neutralised with 40% aqueous sodium hydroxide solution at 20° while stirring. The substance which precipitates is filtered off, washed with 25 ml. of water and dried. 7.98 g. of crude reaction product are obtained as a pale brown powder which melts between 190 and 210° with decomposition. A further 1.63 g. of a solid yellow substance which melts between 166 and 190° is obtained by continuous extraction of the filtrate with ether.

The two crude products are combined and boiled with 25 ml. of methanol. The suspension obtained is cooled and filtered. The grey powder obtained as filtered residue is washed twice with 10 ml. of methanol each time and dried whereupon 6.50 g. (47% of the theoretical) of 3-hydroxy-picolinamide are obtained. M.P. 196–197°.

The methanolic filtrates are evaporated to dryness whereupon 2.43 g. of a solid brown substance remains, M.P. 175–180°. Recrystallisation from 60 ml. of nitromethane produces 0.89 g. (7% of the theoretical) of 3-hydroxy-picolinonitrile as a pale brown powder which melts at 211–220° with decomposition. On further recrystallising from nitromethane the substance is obtained white without its melting point rising.

*Example 6*

8.30 ml. of 5-furyl-(2')-hydantoin are suspended in 50 ml. of water. The equimolar amount of chlorine (2.2 ml. measured at −70°) is introduced within 15 minutes at 20°. The weakly exothermic reaction produces an acid, almost clear, pale yellow solution. 20 ml. of concentrated hydrochloric acid are added to this solution and the whole is refluxed for 2 minutes. The reaction solution, which is now very dark, is cooled and the pH is adjusted to 6 with solid sodium hydroxide. The brown precipitate is filtered off, washed with water and recrystallised from methanol. The white crystals obtained of 3-hydroxypicolinic acid amide melt at 195–197° (corrected). The yield is 10% of the theoretical.

*Example 7*

(a) 122 g. (1 mol) of crude α-furyl-(2)-glycolonitrile ($n_D^{25}$ 1.4915, compare Example 5(a)) are dissolved in 200 ml. of 99% ethanol and 100 g. of anhydrous magnesium sulphate are added. The mixture is cooled to −35° and while stirring and cooling 100 g. of liquid ammonia is added. Then the cooling bath is removed while the stirring continues. During 60 to 90 minutes the temperature rises from −35° to about 30° and then drops to room temperature. The salt is removed by filtration and washed with 100 ml. of ethanol. The filtrate and washings (a clear, very dark red solution) is concentrated at 50° under decreasing pressure ending at 20 mm. The black oily residue is dissolved in a mixture of 200 ml. of ethanol and 200 ml. of diethyl ether. To form the hydrochloride of the α-furyl-(2)-α-amino-acetonitrile freshly prepared 10 N ethanolic hydrogen chloride is added while stirring and cooling until the solution is neutralized (controlling electrometrically with a glass electrode. Approximately 35 ml. is needed). The resulting light grey precipitate is isolated by filtration and washed with two 50 ml. portions of diethyl ether. The yield is 96 g. (61% of the theoretical) of α-furyl-(2)-α-amino-acetonitrile hydrochloride. The compound is somewhat hygroscopic and has no sharp melting point.

(b) 1.58 g. (0.010 mol) of the above hydrochloride are suspended in 40 ml. of 6 N aqueous hydrochloric acid. 0.85 g. (0.012 mol) of chlorine is passed into the suspension while stirring at 30° for 30 minutes the clear, yellow solution is brought to pH 1 by the prompt addition of 40% aqueous sodium hydroxide solution at 0°. The resulting precipitate of 3-hydroxy-picolinonitrile is immediately filtered, washed with 5 ml. of water and dried at 70° and under 20 mm. pressure for 1 hour. The yield is 0.63 g. (53% of the theoretical), M.P. in an evacuated tube is 221° (Hershberg-apparatus, corrected). Sublimation at 150° and 0.1 mm. pressure gives 0.60 g. (50% of the theoretical) of analytically pure product with the same melting point.

*Example 8*

(a) 5.00 g. of α-furyl-(2)-α-amino-acetonitrile are dissolved in 30 ml. of water. 100 ml. of concentrated hydrochloric acid is added at 20° and the resulting suspension is stirred 15 hours at 20°. Then the precipitated α-furyl-(2)-α-amino-acetamidehydrochloride is isolated by filtration and washed with 25 ml. of 9 N hydrochloric acid and 25 ml. of ethanol, giving 4.24 g. (76% of the theoretical) of an almost white powder, which melts in an evacuated tube at 275° with decomposition.

(b) 1.77 g. (0.010 mol) of the hydrochloride prepared according to (a) above are suspended in 50 ml. of 6 N hydrochloric acid and 0.85 g. (0.012 mol) of chlorine is passed into the suspension while stirring at 30° for 90 minutes.

The resulting clear, light yellow solution is brought to pH 2 by the addition of 40% aqueous sodium hydroxide solution. The precipitate of 3-hydroxy-picolinic-acid amide is isolated by filtration, washed with 5 ml. of water, dried and sublimated at 150° and under 0.1 mm. pressure. Yield 0.53 g. (38% of the theoretical), M.P. 194°.

*Example 9*

1.58 g. (0.010 mol) of α-furyl-(2)-α-amino-acetonitrile hydrochloride (compare Example 7(a) are suspended in 40 ml. of 6 N hydrochloric acid. 0.85 g. (0.012 mol) of chlorine is passed into the suspension while stirring at 30° during 30 minutes. The clear yellow solution is left standing at room temperature for 5 days and then brought to pH 2 through the addition of 40% aqueous sodium hydroxide solution. The precipitate of 3-hydroxy-picolinic acid amide is further processed analogously to Example 8(b).

*Example 10*

300 g. of 3,4-dihydro-2,4-dioxo-2H-pyrido[2,3-e][1,3] oxazine(2H-pyrido[2,3-e][1,3]oxazine - 2,4(3H) - dione according to Chem. Abstr. nomenclature) are refluxed one hour with 915 ml. of 2 N hydrochloric acid and 550 ml. of water. Then the hot solution is brought to pH 5–6 with concentrated aqueous ammonia solution. After cooling to 0°, the precipitate is filtered off, and washed with water. 231–246 g. of 3-hydroxy-picolinic acid amide are obtained, corresponding to 92–96% of the theoretical yield.

*Example 11*

12 g. (0.10 mol) of 3-hydroxy-picolinonitrile are stirred with 300 ml. of concentrated hydrochloric acid during 5 days at room temperature (20–25°). The reaction mixture is brought to pH 4–5 by addition of 40% aqueous sodium hydroxide solution. The 3-hydroxy-picolinic acid amide is filtered off, washed with water and purified by crystallisation from hot water. The yield is 90–95% of the theoretical.

We claim:
1. A process for the production of 3-hydroxypicolinic acid amide of the formula

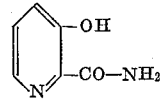

(III)

comprising
(a) mixing 5-(2'-furyl)-hydantoin of formula

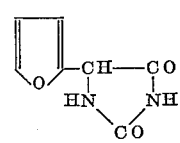

with an oxidizing agent, in an aqueous medium having an acidity corresponding to that of 0.5 to 8-N hydrochloric acid, and raising the temperature of the mixture to about 30 to 100° C. until the ensuing reaction is complete, and then (b) recovering the aforesaid amide of Formula III.

2. A process according to claim 1, wherein the oxidizing agent is an elementary halogen having an atomic weight between 35 and 80.

3. A process according to claim 1, wherein the oxidizing agent is chlorine.

4. A process for the production of 3-hydroxypicolinic acid amide comprising (a) mixing 5-(2'-furyl)-hydantoin with an oxidizing agent, in an aqueous medium having an acidity corresponding to that of 0.5 to 8-N hydrchloric acid, and maintaining the temperature of the mixture at from slightly below to room temperature until the ensuing reaction is complete, and then recovering the resulting 3,4 - dihydro - 2,4-dioxo-2H-pyrido[2,3-e][1,3] oxazine;

(b) maintaining the latter in a medium selected from the group consisting of water, acidified aqueous medium and alkaline aqueous medium at a temperature ranging from room temperature to the boiling temperature of the reaction mixture for a period of at least one and up to about 5 hours and longer, reciprocally corresponding to said temperature; and (c) recovering the aforesaid 3-hydroxy-picolinic acid amide.

5. A process for the production of 3-hydroxypicolinic acid amide, comprising (a) mixing and thereby reacting a compound of the formula

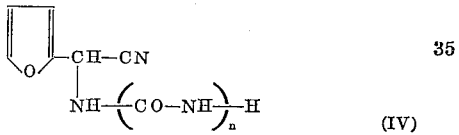

(IV)

wherein $n$ is an integer ranging from 0 to 1, with an oxidizing agent, in an aqueous medium having an acidity corresponding to that of 0.5 to 8-N hydrochloric acid, and maintaining the temperature of the mixture at from about 0° to 80° C. until the ensuing reaction is complete, (b) separating the resulting precipitate from the reaction mixture after the addition of the oxidizing agent is terminated, and (c) extracting the separated precipitate with methanol, thereby dissolving 3-hydroxypicolinonitrile in the latter, and (d) recovering 3-hydroxypicolinic acid amide from the residue.

6. A process for the production of 3-hydroxypicolinic acid amide, comprising (a) mixing and thereby reacting a compound of the formula

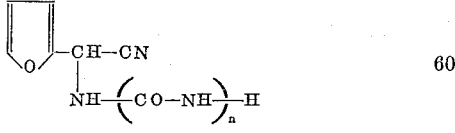

wherein $n$ is an integer ranging from 0 to 1, with an oxidizing agent in an aqueous medium having an acidity corresponding to that of from 0.5 to 8-N hydrochloric acid and maintaining the temperature during the admixture of the oxidizing agent at a temperature of at least about room temperature;

(b) and leaving the reaction mixture to react at a temperature ranging from approximately room temperature to boiling temperature for a period ranging from 2 to 5 minutes at the maximum aforesaid temperature to about 24 hours and longer at the aforesaid minimum temperature; and then (c) recovering the resulting 3-hydroxypicolinic acid amide from the reaction mixture.

7. A process for the production of 3-hydroxypicolinonitrile, comprising (a) mixing and thereby reacting a compound of the formula

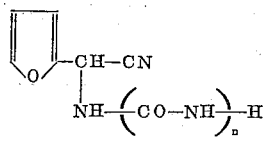

wherein $n$ is an integer ranging from 0 to 1, with an oxidizing agent in an aqueous medium having an acidity corresponding to that of from 0.5 to 8-hydrochloric acid, and maintaining the temperature during the admixture of the oxidizing agent at about 0° to 30° C., (b) separating the resulting precipitate from the reaction medium at a time ranging from immediately after termination to not longer than 2 hours after termination of the admixture of the oxidizing agent, depending on the temperature prevailing during step (a), while maintaining the temperature of the reaction mixture during step (b) at not higher than 25° C., (c) recovering 3-hydroxy-picolinonitrile from the reaction mixture.

8. A process for the production of 3-hydroxy-picolinonitrile, comprising (a) mixing and thereby reacting a compound of the formula

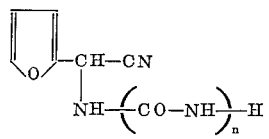

wherein $n$ is an integer ranging from 0 to 1, with an oxidizing agent in an aqueous medium having an acidity corresponding to that of from 0.5 to 8-N hydrochloric acid, and maintaining the temperature during the admixture of the oxidizing agent at about 0° to 30° C., (b) separating the resulting precipitate from the reaction medium at a time ranging from immediately after termination to not longer than 2 hours after termination of the admixture of the oxidizing agent, depending on the temperature prevailing during step (a), while maintaining the temperature of the reaction mixture during step (b) at not higher than 25° C., (c) extracting the crude precipitate obtained from step (b) with methanol, and (d) recovering 3-hydroxy-picolinonitrile from the methanolic extract.

9. A process for producing 3-hydroxy-picolinic acid amide, comprising (a) mixing and thereby reacting α-amino-2-furanacetamide of the formula

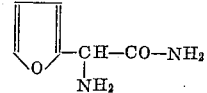

with an oxidizing agent, in an aqueous medium having an acidity corresponding to that of 0.5 to 8-N hydrochloric acid, and then recovering the precipitating amide 3-hydroxy-picolinic acid amide from the reaction mixture.

10. A process according to claim 9, wherein the oxidizing agent is an elementary halogen having an atomic weight between 35 and 80.

11. A process according to claim 9, wherein the oxidizing agent is chlorine.

12. The compound of the formula
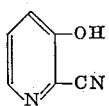
References Cited by the Examiner
UNITED STATES PATENTS
| | | | |
|---|---|---|---|
| 2,304,830 | 12/1942 | Katzman | 260—295 |
| 2,439,728 | 4/1948 | Gross | 260—295 |
| 2,938,035 | 5/1960 | Cislak | 260—294.9 |
| 2,943,091 | 6/1960 | Cislak | 260—294 |
| 3,043,853 | 7/1962 | Ebetino | 260—347.3 |
| 3,057,879 | 10/1962 | Corrodi et al. | 260—347.3 |
| 3,122,538 | 2/1964 | Clauson-Kass et al. | 260—244 |
| 3,178,427 | 4/1965 | Gassmann et al. | 260—244 |
WALTER A. MODANCE, *Primary Examiner.*
ROBERT T. BOND, A. L. ROTMAN,
*Assistant Examiners.*